United States Patent [19]

Kobayashi et al.

[11] Patent Number: 5,592,207
[45] Date of Patent: Jan. 7, 1997

[54] OPTICAL RECORDING APPARATUS

[75] Inventors: Shinya Kobayashi, Mito; Akira Arimoto, Hitachi; Hiroo Fujisaki, Hadano; Susumu Saito, Mito, all of Japan

[73] Assignees: Hitachi, Ltd.; Hitachi Koki Co., Ltd., both of Tokyo, Japan

[21] Appl. No.: 945,799

[22] Filed: Sep. 16, 1992

[30] Foreign Application Priority Data

Sep. 20, 1991 [JP] Japan ................................. 3-241870

[51] Int. Cl.⁶ ........................................................ G01D 15/14
[52] U.S. Cl. .............................. 347/129; 347/132; 358/451
[58] Field of Search ...................................... 346/108, 160;
358/298, 459, 451, 456, 459, 458; 347/129,
131, 132, 225, 251

[56] References Cited

U.S. PATENT DOCUMENTS

| | | | |
|---|---|---|---|
| 4,566,042 | 1/1986 | Cahill | 358/298 X |
| 4,578,689 | 3/1986 | Spencer et al. | 346/160 |
| 4,681,424 | 7/1987 | Kantor et al. | 355/14 R |
| 4,926,248 | 5/1990 | Kobayashi et al. | 358/298 X |
| 5,055,860 | 10/1991 | Bannai | 346/108 |
| 5,093,674 | 3/1992 | Storlie | 346/108 |
| 5,134,495 | 7/1992 | Frazier et al. | 346/108 X |
| 5,144,338 | 9/1992 | Sakano | 346/108 |
| 5,182,575 | 1/1993 | Kato et al. | 346/108 |
| 5,193,008 | 3/1993 | Frazier et al. | 346/108 X |
| 5,208,456 | 5/1993 | Appel et al. | 346/108 X |
| 5,241,324 | 8/1993 | Tamura et al. | 358/298 X |
| 5,241,330 | 8/1993 | Kawabata et al. | 346/108 |
| 5,404,233 | 4/1995 | Nagata et al. | 358/447 |

FOREIGN PATENT DOCUMENTS

| | | |
|---|---|---|
| 0356038 | 2/1990 | European Pat. Off. . |
| 1774418 | 1/1972 | Germany . |
| 4016251 | 3/1993 | Germany . |
| 60-165866 | 8/1985 | Japan . |
| 61-38922 | 2/1986 | Japan . |
| 62-275214 | 11/1987 | Japan . |
| 1-127353 | 5/1989 | Japan . |

OTHER PUBLICATIONS

Xerox Disclosure Journal, vol. 1, No. 1, Jan. 1976, pp. 97–98.

*Primary Examiner*—Brian W. Brown
*Assistant Examiner*—Randy Gibson
*Attorney, Agent, or Firm*—Kenyon & Kenyon

[57] ABSTRACT

A laser printer can record high definition and high quality images without requiring any increase of electrical and mechanical design precision for increasing a scanning line density thereof. The laser beam is deflected in a primary scanning direction and a subsidiary scanning direction. With such scanning, an artificial scanning line along an edge of a recording image can be established for accurately recording an oblique line, a curved line, a barbel portion of a character, a half-tone image or so forth.

22 Claims, 15 Drawing Sheets

OBLIQUE LINE

CURVED LINE

OBLIQUE LINE

CURVED LINE

PROTTER

LASER PRINTER (CONVENTIONAL SYSTEM)

LASER PRINTER (PRESENT INVENTION)

FIG. 5A
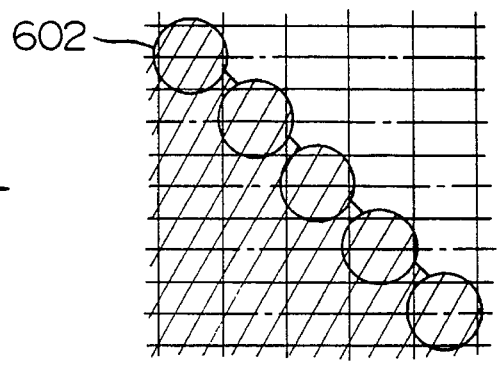
FIG. 5B
FIG. 5C
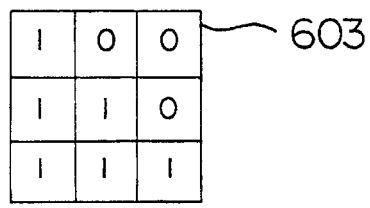
FIG. 5D
FIG. 5E
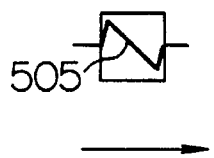
FIG. 5F
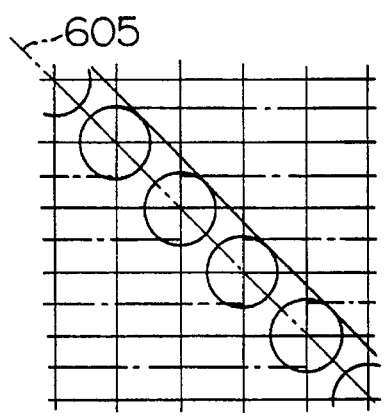

FIG.6A
FIG.6B
| 1 | 0 | 0 |
| 1 | 1 | 0 |
| 1 | 1 | 0 |
FIG.6C
| 1 | 1 | 0 |
| 1 | 1 | 0 |
| 1 | 1 | 1 |
FIG.6E
FIG.6F
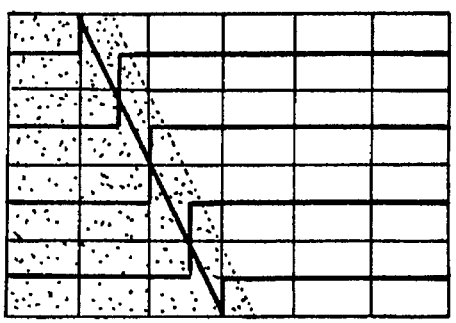
| 1 | 1 | 0 | 0 | 0 | 0 |
| 1 | 1 | 0 | 0 | 0 | 0 |
| 1 | 1 | 1 | 0 | 0 | 0 |
| 1 | 1 | 1 | 0 | 0 | 0 |
FIG.6D
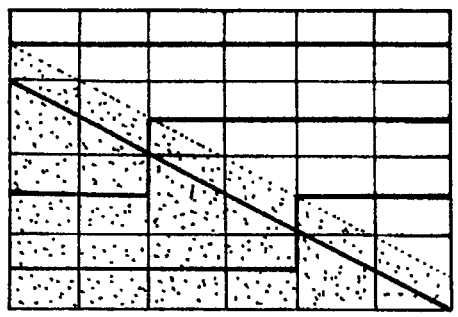
FIG.6G
| 1 | 0 | 0 |
| 1 | 1 | 1 |
| 1 | 1 | 1 |
FIG.6H
FIG.6I
| 0 | 0 | 0 |
| 1 | 1 | 0 |
| 1 | 1 | 1 |
FIG.6K
FIG.6L
| 0 | 0 | 0 | 0 | 0 | 0 |
| 1 | 1 | 0 | 0 | 0 | 0 |
| 1 | 1 | 1 | 1 | 0 | 0 |
| 1 | 1 | 1 | 1 | 1 | 1 |
FIG.6J

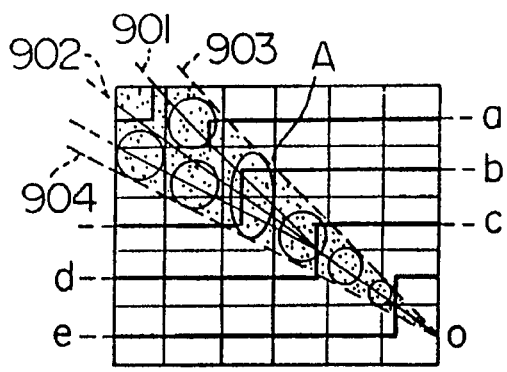

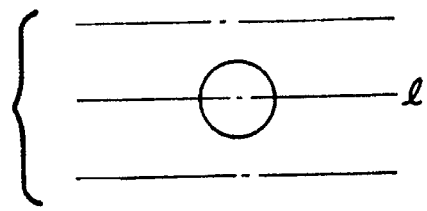
FIG. 13A
PRIOR ART
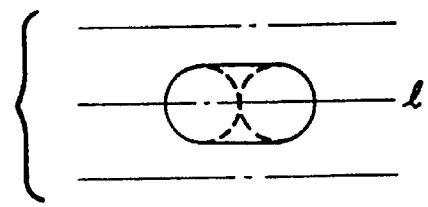
FIG. 13B
PRIOR ART
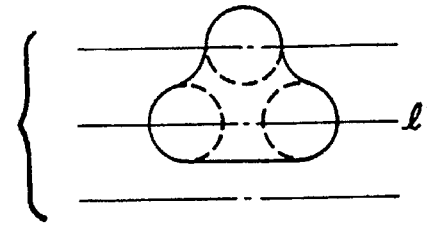
FIG. 13C
PRIOR ART
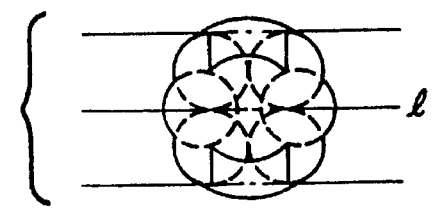
FIG. 13D
PRESENT
INVENTION
FIG. 14
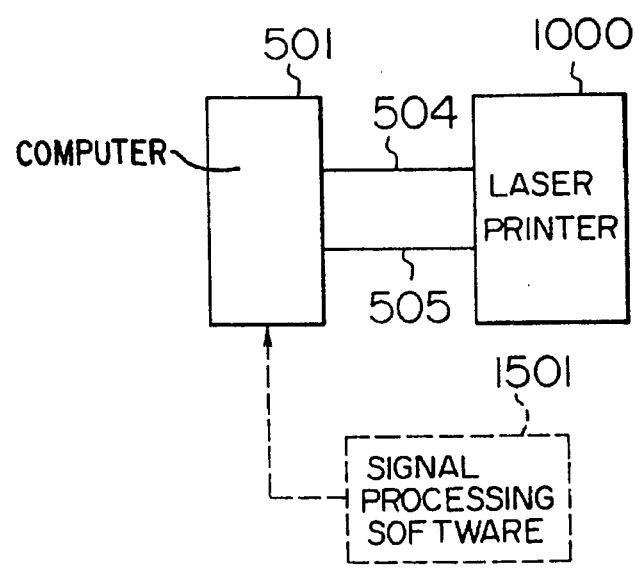

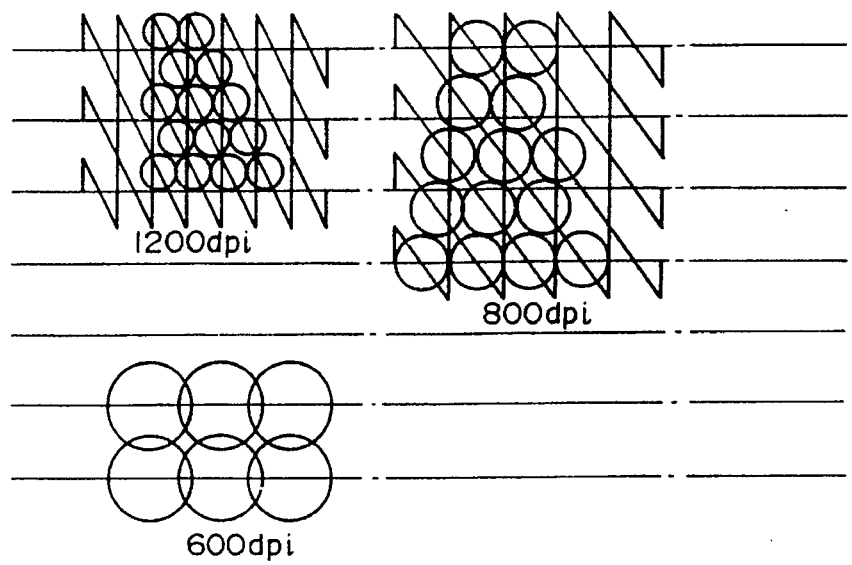
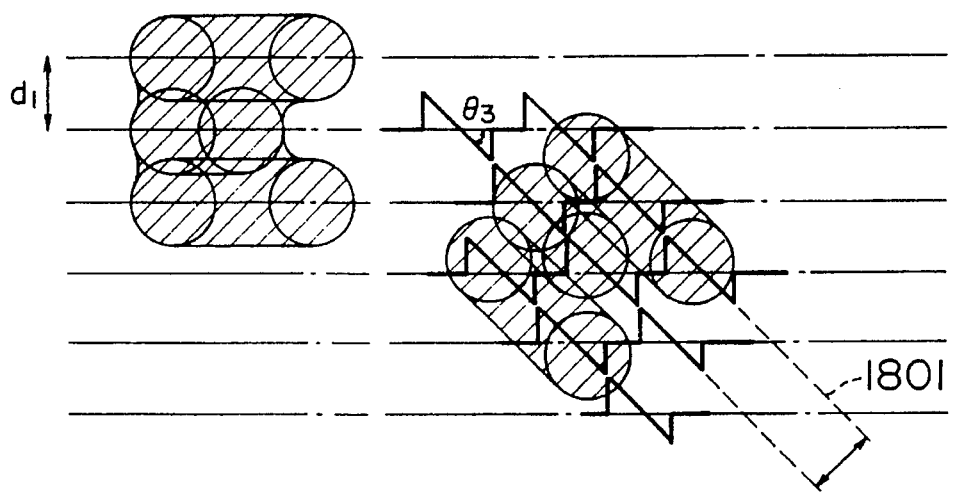

OPTICAL RECORDING APPARATUS

BACKGROUND OF THE INVENTION

The present invention relates generally to an optical recording apparatus for recording an image by scanning a light beam in parallel and in order for exposure. More specifically, the invention relates to an image signal modulation device for an optical printer for high definition printing employing an electronic photographic process.

In recent years, laser printers having a capability of high speed and high quality recording have become popular despite a slightly higher cost due to a complicated construction in comparison with other printers.

However, when line images formed with oblique lines or curved lines, such as those in graphs or drawings, are recorded by means of a laser printer, the lines can become rugged in appearance and thus cannot be recorded with satisfactory sharpness. Therefore, for such images, XY plotters are still frequently used. Since the XY plotters employ normal pen points (approximately 100 to 500 µm in diameter), they cannot make fine recording as that which can be done using a laser primers (60 to 100 µm in dot diameter). However, XY plotters are able to record the oblique lines or the curved lines with uniform thickness and satisfactory sharpness.

The reason is that the pen point moves along the oblique line or the curved line to draw sharp contour when the XY plotter is used for recording the oblique line or the curved line.

On the other hand, Japanese Patent Document No. JP-A-61-38922 discloses a laser primer which modifies a laser beam in a scanning direction and a direction perpendicular to the scanning direction (i.e., the subsidiary scanning direction). An ultrasonic wave light deflector is inserted between a laser beam source and a polygon mirror so as to enable deflection in the subsidiary scanning direction. In addition, there are printers having an electro-optical deflector, a galvanomirror, a piezoelectric element, to which a reflector mirror or lens is attached, and so forth.

On the hand, the beam emitted from a laser oscillator and converted into a parallel beam by a lens is displaced in the subsidiary scanning direction by means of the ultrasonic deflector. Discussion with respect to the ultrasonic deflector has been given in Shibayama: "Elastic Surface Wave Technology", the Institute of Electronics and Communication Engineers. pp 132–141 (1983).

Furthermore, Japanese Patent Document No. JP-A-62-275214 discloses a variable focusing element which employs a semiconductor laser as a light source, an ultrasonic deflector for a spot position control in the subsidiary scanning direction and an EO (electro-optic) effect as an elements for spot diameter variation.

In addition, Japanese Patent Document No. JP-A-60-165866 discloses an apparatus, in which the laser beam is repeatedly deflected in the subsidiary scanning direction with respect to each pixel (or dot) as a unit of recording for forming an image as an image information.

The above-mentioned prior art references have a common problem in drawing all oblique and curved lines except for horizontal and vertical lines. This problem can be solved by increasing the scanning density of scanning lines. However, to achieve a satisfactorily high density, it becomes necessary to solve the following problems. Therefore, the satisfactory density cannot be easily achieved.

The problems to be solved are:

(1) to increase the rotation speed of the polygon mirror;

(2) to make the spot diameter of the laser beam smaller; and (3) to use a fine particle toner for developing.

In addition, when a line image constituted by oblique lines and/or curved lines, such as a graph or a drawing is drawn by the laser printer, since the recording unit is the pixel, the recording of the lines with satisfactory sharpness cannot be achieved because the lines are inherently drawn in rugged configuration unless the size of the pixel is reduced to be not susceptible by the human eye. Additionally, in the above-mentioned prior art, since the position of the beam spot corresponding to the recording dot cannot be moved along the edge of the oblique line or the curved line, it is not possible to achieve the recorded image quality of the oblique line or the curved line as that can be achieved in recording an XY plotter. A similar problem arises in the case where an image other than a line image is drawn in addition to the line image. Therefore, progressively increasing needs have developed for drawing oblique and curved lines by a laser printer with equivalent quality to that achieved by the above-mentioned plotter.

In the above-mentioned prior art employing the plotter, although the above-mentioned advantage can be achieved, it can be defective due to a lack of resolution or a low recording speed in recording an image other than a line image. Therefore, such a plotter is not practically useful for recording an image other than a line image. For instance, unless the pen point is made sufficiently small, smaller characters can be defaced. Also, when a half-tone image is drawn as an image constituted with half-tone dots, dots must be drawn in a one-by-one basis, requiring a terribly long period of time.

SUMMARY OF THE INVENTION

The present invention relates to a recording apparatus which can increase a density of scanning lines without requiring higher precision in mechanical and electrical design and can achieve both features of a laser beam printer and a plotter, with a laser printer.

A deflector is provided in a laser optical system for deflecting a laser beam in a subsidiary scanning direction so that the scanning line position can be displaced in the subsidiary direction with respect to each pixel depending upon the image to be recorded.

On the other hand, an artificial scanning line is formed in a direction different from a primary scanning direction and the subsidiary scanning direction.

Since the scanning line of the laser beam is displaced not only in the primary scanning direction but also in the subsidiary scanning direction with respect to each pixel depending upon the image to be recorded, it becomes possible to perform recording with freely setting the size of the pixel. Also, since the laser beam is allowed to scan (artificial scan) in a direction other than the primary and subsidiary scanning directions, along the end of the configuration of the image to be recorded by combining primary scan and subsidiary scan, the laser beam is enabled to accurately trace any configuration of the image.

BRIEF DESCRIPTION OF THE DRAWINGS

FIGS. 5A to 5F are illustrations showing a manner of generation of a displacement magnitude in a subsidiary scanning direction;

FIGS. 6A to 6L are illustrations showing a manner of generation of a displacement magnitude in the subsidiary scanning direction;

FIGS. 8A to 8N are illustrations showing a manner of generation of a displacement magnitude in the subsidiary scanning direction;

FIGS. 13A to 13D illustrations a manner of forming half-tone dots;

FIG. 14 is a block diagram showing a system of the laser printer according to the invention;

FIGS. 16A to 16C are illustrations showing a result of partial variation of the resolution;

FIGS. 17A to 17C are illustrations showing a manner of recording a rotated figure;

DESCRIPTION OF THE PREFERRED EMBODIMENTS

Figure 1:
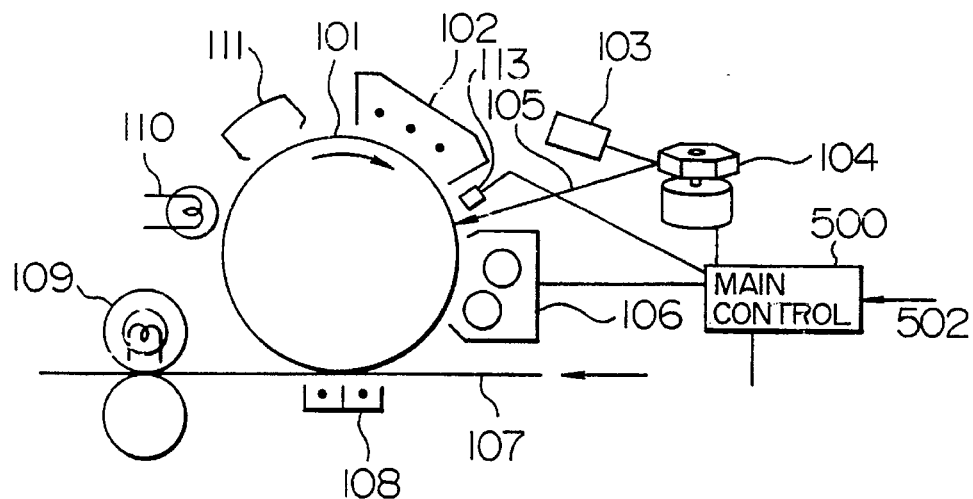
FIG. 1 is an illustration showing principle of a laser printer.

At first, for disclosing the present invention, a principle of recording of a laser beam printer will be discussed with reference to FIG. 1.

A rotary photosensitive drum 101 is, at first, uniformly electrostatically charged by an electrostatic charger 102 at a dark portion. Then, a laser beam 105 scanned and modulated by a laser 103 and a polygon mirror (rotary polygon mirror) 104 based on an image signal is irradiated onto the photosensitive drum 101 to form an electrostatic latent image. The electrostatic latent image is subject to toner development by a developer 106 containing toner and a carrier. The developed image is then transferred on a recording speed 108 by transferring device 107. The tonor image of the recording sheet 108 is finally fixed by a pressure heat fixing by a fixer 109. On the other hand, the toner and the electrostatic latent image on the photosensitive drum 101 are removed by an erase lamp 110 and cleaner 111. The laser 103, the polygon mirror 104 and the photosensitive drum 101 etc. are controlled by a controller 500.

Figure 2A:
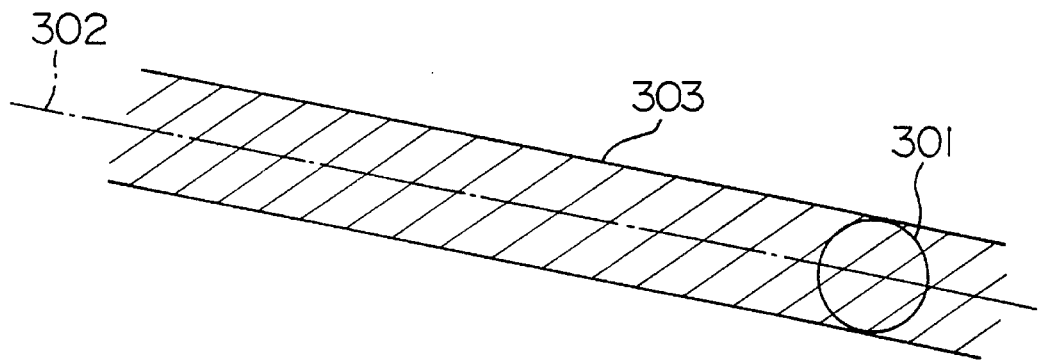
FIGS. 2A to 2C are illustrations showing a manner of recording of an oblique line.
Figure 2B:
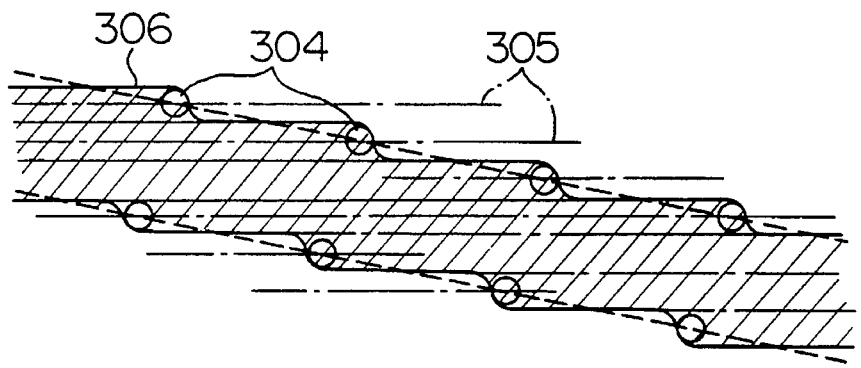
Figure 2C:
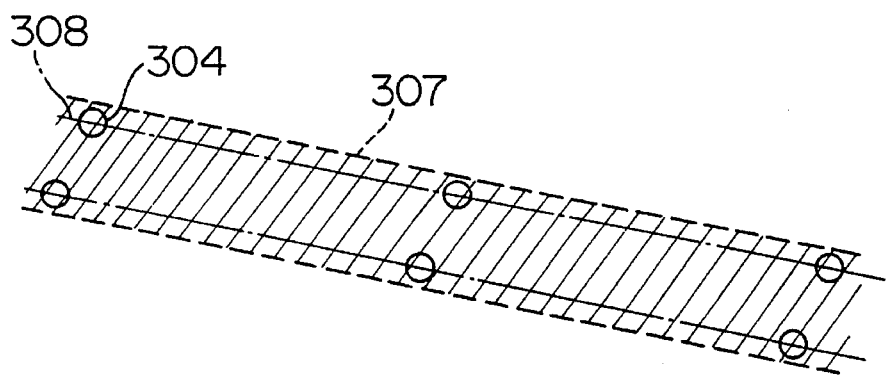

The results of recording when an oblique line is recorded are shown in FIGS. 2A, 2B and 2C. FIG. 2A shows an image recorded by a plotter. Since a recording dot 301 of a pen point moves on a scanning line 302 extending along the oblique line, a uniform line width and sharp edges 303 can be realized. FIG. 2B shown an image recorded by a conventional laser printer. Although the recording dots 304 of the laser printer are smaller than the recording dot 301 of the plotter, the line width becomes uneven, and edges become rugged configuration for horizontal scanning direction. This can appear on any of the oblique and curved lines other than the horizontal and vertical lines.

In case of recording of the oblique line shown in FIG. 2C by the laser printer, sharp recording using the same principle as the XY plotter as illustrated in FIG. 2A becomes possible when the recording dot 304 of the laser printer, which can scan only in the horizontal direction in the prior art, can be scanned along an oblique line 308 along the edge 307 (here, the scanning line along the edge of the oblique line will be referred to as the "artificial scanning line"). One artificial scanning line 308 for each edge 307 is sufficient. The artificial scanning line 308 can be realized by the laser printer of horizontal scanning in the following way.

Figure 3A:
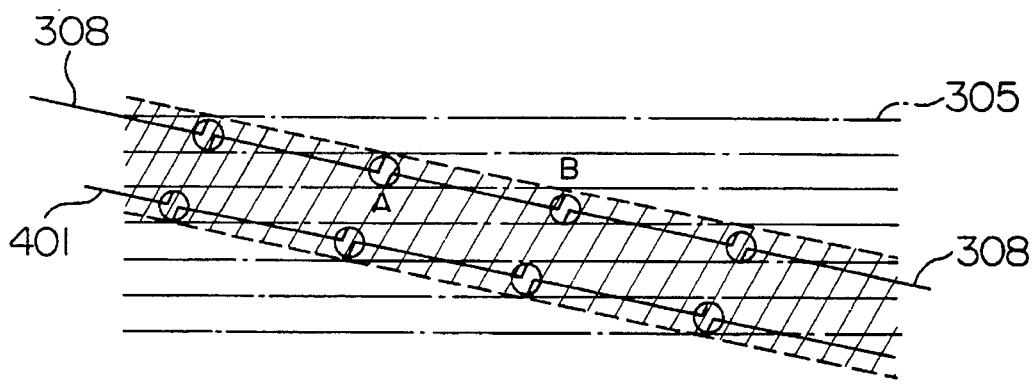
FIGS. 3A and 3B which together comprise FIG. 3 are illustrations showing a manner of forming artificial scanning lines.
Figure 3B:
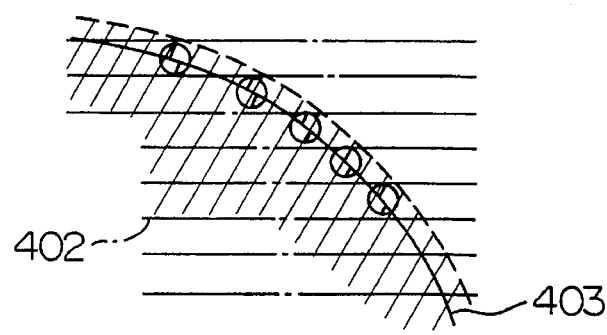

FIG. 3, which includes FIG. 3A and FIG. 3B, shows a manner of forming the artificial scanning line 308. The laser printer according to the present invention is provided with a capability of displacing the laser beam 105 in the vertical direction relative to the horizontal scanning line in a magnitude of at least half pitch. It should be noted that the pitch represents the distance between the scanning lines 305. Thick lines in the drawing represent the portion where the laser beam 105 is displaced relative to the conventional scanning line 305. FIG. 3A shows the case where the oblique line shown in FIG. 2 is recorded. An actual scanning line 401 on which the recording dot 304 is placed by the laser beam 105 on the conventional scanning line up to the position immediately before a point A and displaced upwardly for half pitch immediately after the point A. Subsequently, with gradually reducing the magnitude of displacement, the recording dot 304 is scanned along the artificial scanning line 308 up to a position immediately before a point B. Accordingly, at the position immediately before the point B, the recording dot 304 of the laser beam 105 is displaced downwardly for half pitch. However, it returns on the conventional scanning line 305 at a position immediately after the point B. By causing displacement with respect to the following scanning lines, the artificial scanning line 308 can be completed. Different from a normal scanning line, the laser beam is scanned along the artificial scanning line 308 per every fine section in order. Even in this case, since the light can be overlapped, equivalent exposure amount to the normal scan can be obtained. FIG. 3B shows an example for recording a curved line. With respect to the scanning lines above a scanning line 402, the artificial scanning line 403 can be established substantially in the same manner to that of FIG. 3A. With respect to the scanning lines below the scanning line 402, the displacement of the laser beam is not taken place due to too larger gradient of the artificial scanning line 403. However, this portion is the curved line substantially equivalent to the vertical line, the image quality will not be noticeably degraded even when the portion is drawn in the conventional way.

Figure 4:
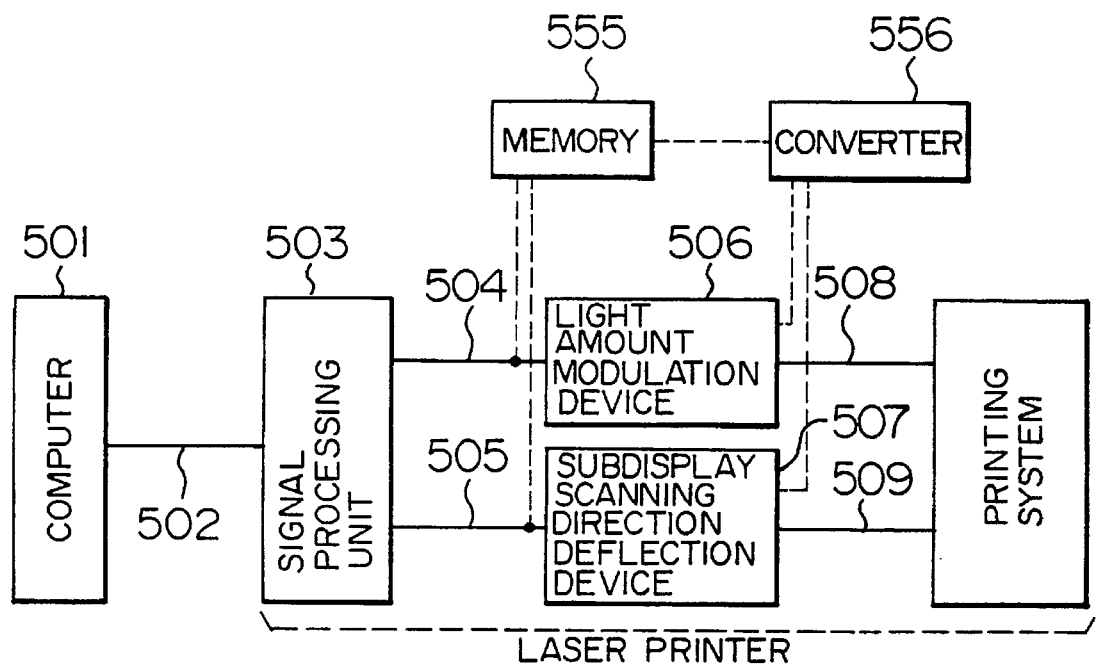
FIG. 4 is a block diagram showing construction of a laser printer according to the present invention.

One embodiment of the present invention will be discussed with reference to FIGS. 4 to 7. FIG. 4 is a schematic block diagram showing a general construction of one embodiment of the laser printer apparatus according to the present invention. In the illustrated construction, pixel data 502 from a computer 501 is normally density data for each of the pixels. The signal processing unit 503 generates a light emitting output signal for the laser corresponding to the scanning position of the laser beam based on the pixel data. The light emitting output signal is input to a light amount modulation unit 506 to control a laser output 508. On the other hand, the signal processing unit 503 generates a beam spot diameter signal 504 corresponding to the scanning position of the laser beam. The beam spot diameter signal 504 is input to a spot diameter modulation unit 506 to control the beam spot diameter 508. In the apparatus according to the present invention, in addition to the foregoing construction of the apparatus, the signal processing unit 503 is designed to produce a subsidiary scanning direction displacement magnitude signal 505 corresponding to the scanning position of the laser beam, in conjunction with the laser output control and the beam spot diameter control. The subsidiary scanning direction displacement magnitude signal is input to a subsidiary scanning direction deflection device 507 to control a displacement magnitude 509 of the scanning line in the subsidiary scanning direction.

Hereafter, discussion will be given (1) for the manner of generating the subsidiary scanning line displacement magnitude signal 505 by the signal processing unit, and (2) for the subsidiary scanning direction deflection device 507.

(1) Manner of Generating the Subsidiary Scanning Direction Displacement Magnitude Signal 505 by Signal Processing Unit 503

In FIG. 5A, figures ("0", "1") in respective of the lattice matrix represent pixel data 502 from the computer 501. FIG. 5A illustrates only a portion of the matrix of the vertically aligned five pixels and horizontally aligned five pixels at the edge of an oblique line in a case that the image to be recorded is the oblique line. Each segment 601 of the matrix represents a region of the pixel as a unit for sampling. The figure in each segment represents the digital value of the sampled image, in which the digital value is established so that "1" represents a black pixel and "0" represents a white pixel. When an image as a serial analog amount is converted into digital values, a recorded image becomes a rugged image formed by connecting pixel regions as shown in FIG. 5B if the image is printed by a conventional laser printer. Namely, the scanning lines simply extend through the center of the pixel region in the horizontal direction. Therefore, the image of each pixel is recorded as the black dot of the dotted oblique line so that the edge of the oblique line cannot be recorded with satisfactory sharpness. According to the present invention, a template matching method is employed so that pixels on the artificial scanning line 308, which is a virtual scanning line established along the edge of the oblique line or the curved line, are extracted from the image data 502 output from the computer. The pixel on the artificial scanning line 308 will be hereafter referred to as an "artificial scanning line pixel 604". Matching of the extracted pixel and template pixels is detected. FIG. 5C shows a template matrix pattern 603. For simplicity, FIG. 5C shows a matrix of three vertically aligned pixels and three horizontal pixels. However, it should be noted that the recognition accuracy is increased according to increasing of the size of the matrix, in a general sense. FIG. 5D shows characteristic points 604 (encircled figures) extracted by the template matching method using the template matrix 603. The characteristic points 604 are the artificial scanning line pixel 604, through which the artificial scanning line 308 extends. FIG. 5E shows the subsidiary scanning direction displacement magnitude signal 505 for displacing the position of the laser beam for actually establishing the artificial scanning line pixel 604. By this position control of the scanning line, the image after recording with the laser printer becomes as illustrated in FIG. 5F, which exhibits a sharp edge of the oblique line. It should be noted that the subsidiary scanning direction displacement magnitude signal 505 is preliminarily stored in a database memory.

It should also be noted that even for the identical image, the optimal laser beam spot diameter signal 504 and the subsidiary scanning direction displacement magnitude signal 505, at which the highest quality of recording can be performed, can be delicately differentiated depending upon an environmental condition, such as a temperature, a humidity and a taste of the user and so forth. Therefore, it is possible to store various kinds of laser beam spot diameter signals 504 and subsidiary scanning line displacement magnitude signals 505 in a non-volatile memory 555, such as an IC card, a disk or so forth so that the laser beam spot diameter signal 504 and the subsidiary scanning line displacement magnitude signal 505 adapted to the recording condition is selected or converted and loaded in an internal memory of the printer. Also, the process of the signal processing unit 503 of FIG. 4 can be externally input as a signal processing software 1501 as illustrated in FIG. 14. In the alternative, it is possible to include the signal processing software in the internal memory of the computer. At this time, as the data to be output from the computer 501 including the signal processing software 1501 to the laser printer 1000, the subsidiary scanning direction displacement magnitude data 505 for each pixel is added to the density data for each pixel in the conventional information processing system.

The illustrated signal processing unit 503 is equally effective for oblique lines other than a 45° oblique line as well as an image with reversal of black and white. The examples are shown in FIGS. 6A to 6L. FIGS. 6A to 6F illustrate the case where the oblique line has a large gradient. Also, FIGS. 6G to 6L illustrate the case where the oblique line has a small gradient. FIGS. 6A and 6G illustrate traces of displacement of the scanning lines. FIGS. 6 6J represent recording pixel data output from the computer respectively therefor. FIGS. 6C, 6F and 6I, 6L show traces of displacement of the scanning lines at front halves and rear halves within the pixels. FIGS. 6B, 6E and 6H, 6K show matrix patterns of the corresponding template pixels. With respect to the matrix patterns 603 of the template pixels, in which the block portions and white portions are reversed as shown in FIGS. 6B, 6H and 6E and 6K, the values "1" and "0" of the matrix patterns 603 of the template pixels are reversed for 180° rotation. Since the shown signal processing unit 503 can be adapted to an angle of the oblique line, it can also be adapted for the curved line.

Next, as the subsidiary scanning direction deflection device 507, an ultrasonic light deflector, an electro-optic deflector, a galvanomirror, a piezoelectric element attached with a reflection mirror or lens can be used. Here, discussion will be made for the ultrasonic light deflector which holds high deflection response characteristics.

Figure 7:
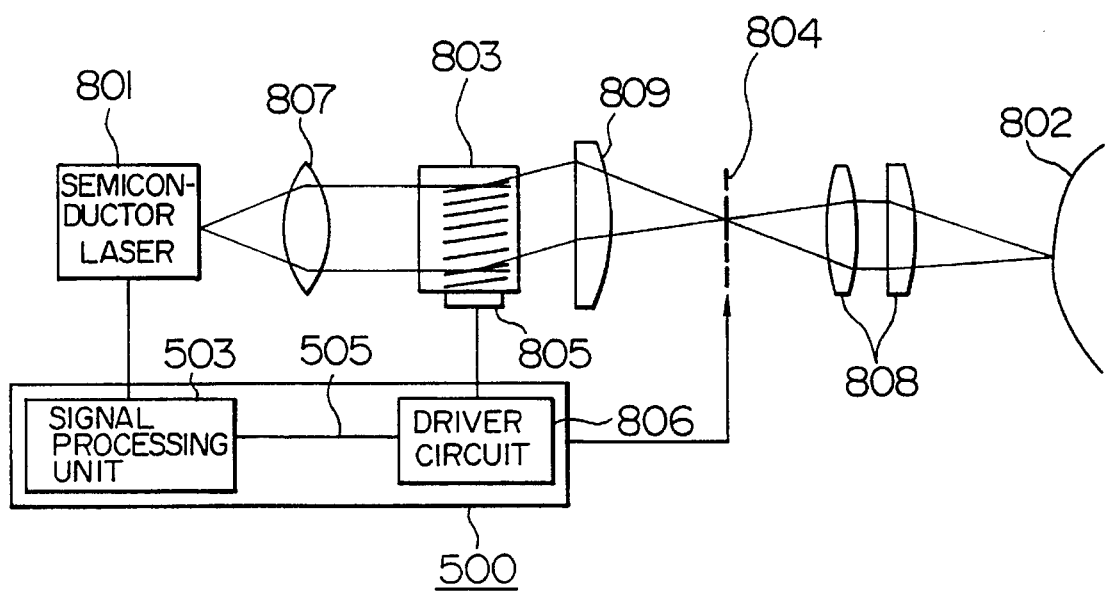
FIG. 7 is an illustration showing construction of a laser optical system.

FIG. 7 shows an optical system of the laser printer. The ultrasonic light deflector 803 employed in the shown embodiment is a Bragg type ultrasonic light deflector sandwiched between a transducer 805 and an acoustic material, which blocks non-diffraction light and uses a primary diffraction beam for exposure of the photosensitive body. A deflection (diffraction) angle of the primary diffraction beam is variable detecting upon a frequency of an acoustic wave charged for the ultrasonic wave light deflector 803. By matching the direction of the primary diffraction beam with the subsidiary scanning direction, the laser printer which can control the displacement magnitude of the spot in the subsidiary scanning direction can be formed. The subsidiary scanning direction displacement magnitude 509 must be at least half of a distance between the scanning lines in both of the positive and negative directions. On the other hand, the subsidiary scanning direction displacement magnitude signal 505 from the signal processing unit 503 is converted into a frequency of a voltage for driving the transducer 805 by a driver circuit 806. For example, when the ultrasonic wave light deflector is set to scan on the normal scanning line at a frequency f, scanning of the upper side or lower side of the normal scanning line is performed by variation of the deflection angle of the laser beam by increasing the frequency to $f+\Delta f$ or decreasing the frequency to $f-\Delta f$.

According to the shown embodiment, the oblique line or the curved line can be recorded with a uniform line width and a satisfactory sharpness equivalent to a plotter without increasing the density of the scanning line 305 of the laser printer. Also, in the shown embodiment, a light amount modulation device can be provided simultaneously. Therefore, when a gap can be formed between the modulated scanning lines by the subsidiary scanning direction displacement magnitude control for the spot, such gap can be eliminated by increasing the light amount to be irradiated at the corresponding portion or by expanding the beam spot diameter.

Figure 9A:
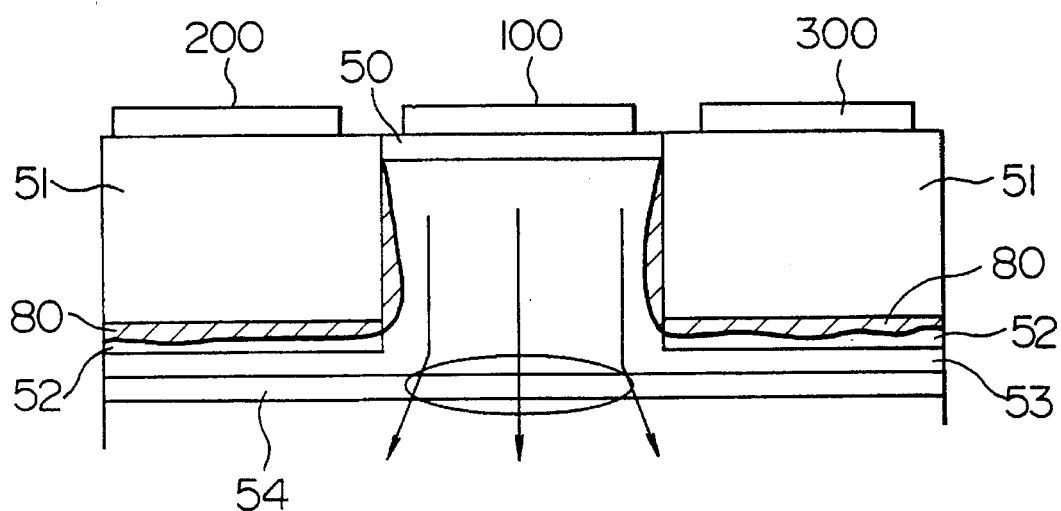
FIGS. 9A and 9B are sections of a laser beam generating element with a variable discharge spot diameter.
Figure 9B:
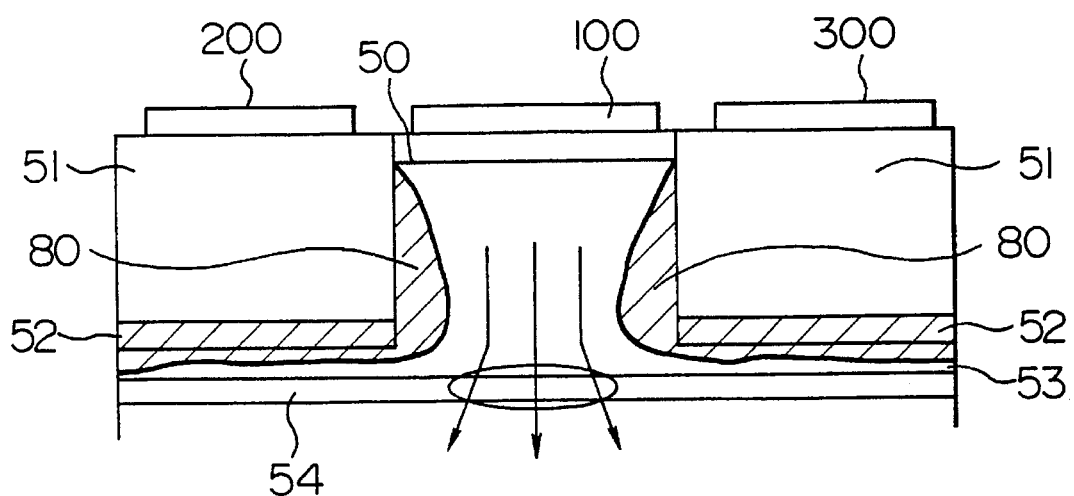
Figure 10:
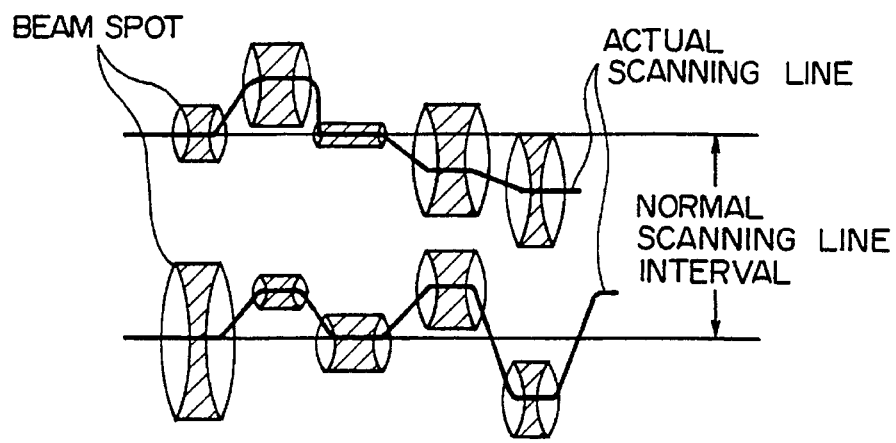
FIG. 10 is an illustration showing a control method for a spot diameter and a position.

Another embodiment of the present invention will be discussed herebelow with reference to FIGS. 8 to 10. For improving lack of resolution of the laser printer, namely degradation of the image quality due to sampling error, it is required accuracy of length of an acute angle portion which is called as a barbel of the character. FIGS. 8A to 8H-2 illustrate a manner for generating the subsidiary scanning line displacement magnitude for such barbel portion. FIG. 8A is an illustration of the barbel portion of the character present in the pixel data 502 from the computer, in the matrix of five vertically aligned pixels and six horizontally aligned pixels. If this barbel portion is recorded by means of the conventional laser printer, the recorded image becomes as illustrated in FIG. 8B. In the recorded image, the dotted portion represents the block area. The conventional method holds the problem, in which the tip end of the barbel portion is not reproduced to make the recorded image shorter than that should be. Also, even in the former embodiment, since both side edges at the tip end are too close, it becomes necessary to form two artificial scanning lines in one pixel. This is not possible. Therefore, in the shown embodiment, when the referenced pixel is recognized as the tip end portion of the barbel portion through matching with the template, the subsidiary scanning line displacement magnitudes of respective scanning lines are adjusted so that the artificial scanning line becomes a bisector of the angle forming the tip end. Simultaneously, the beam spot size is gradually varied so as to avoid cutting of the tip end to make the recorded barbel image to have the accurate length. FIGS. 8C-1 to 8H-1 and 8C-2 to 8H-2 show concrete examples. FIGS. 8C-1 to 8H-1 show the matrix patterns of the template pixels. On the other hand, FIGS. 8G-2 to 8H-2 show displacements of the beam scanning with the pixels. In order to identify the matrix position, respective rows are assigned as a, b, c . . . from the top and respective columns are assigned as 1, 2, 3 . . . from the left to right. The pixels a1 and b2 cannot form the artificial scanning line pixels through which the upper side artificial scanning line 901 extends.

Similarly, the pixels b1 and c2 cannot form the artificial scanning line pixels, through which the lower side artificial scanning line 902 extends. The pixels c3, d4, d5, e5, e6 through which both artificial scanning lines 901 and 902 extend, cannot form the artificial scanning line. Therefore, in these pixels, the bisector OA of the angle defined by both edges 903 and 904 is established as the artificial scanning line OA. Simultaneously, at a point A, the beam stop is formed into the vertically elongated configuration. Then, the beam spot size is gradually reduced. By this way, the barbel portion can be accurately recorded with the exact tip end. This is a similar matter of recording of the barbel portion by a writing brush.

Next, discussion will be given for a laser of variable emitting spot diameter with reference to FIGS. 9A to 12B. The variable emitting spot diameter laser controls the emitting spot diameter by forming a void layer 80 with the current applied to side electrodes 200 and 300 so that the portion to flow the laser exciting current is controlled (FIGS. 9A and 9B). At this time the emitting light spot area is variable in the horizontal direction on the drawings. Therefore, the spot diameter in the subsidiary scanning direction can be varied by matching the direction of variation of the emitting light area to match with the subsidiary scanning direction. The emitted light spot diameter depends on the magnitude of the current applied to the side electrodes. A primary scan of the laser is performed by light deflection with the rotary polygon mirror according to the conventional method. By combining this laser with the above-mentioned subsidiary scanning direction deflection device 507, a laser printer which can independently control the restricted spot diameter and the position of the spot in the subsidiary scanning direction, can be provided.

Another embodiment of the laser spot diameter modulation element will be discussed with reference to FIGS. 11, 12A and 12B.

Figures 12A, 12B:
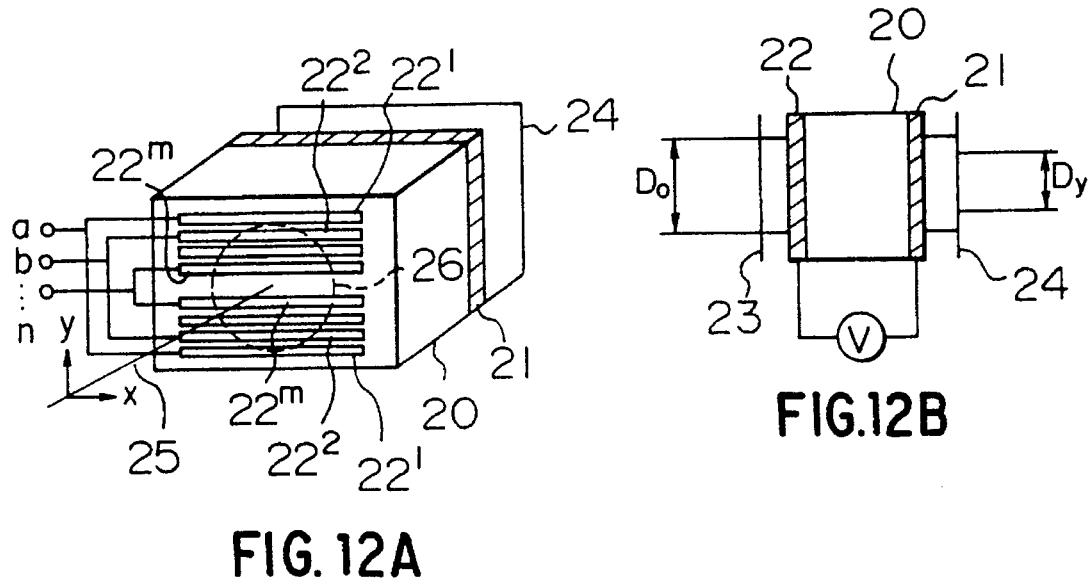
FIGS. 12A and 12B illustrate a construction of a laser beam flux diameter modulating element.

In the shown embodiment, a semiconductor laser 801 is used as a light source, the ultrasonic wave light deflector is employed for controlling the spot position in the subsidiary scanning direction, and a variable focusing element 810 using an EO (electro-optic) effect as shown in FIGS. 12A and 12B as a component for varying the spot diameter.

As shown in FIGS. 12A and 12B, the EO element includes an electro-optic crystal 20. A common electrode 21 is provided at one side of the electro-optic crystal 20, and a plurality of mutually insulated transparent elements, such as those of $22^1, 22^2, \ldots 22^n$ at the other end of the electro-optic crystal are provided in adjacent relationship to each other. Each two of these transparent electrodes $22^1, 22^2, \ldots 22^n$ form a pair. Each pair are arranged to be positioned symmetrically relative to a beam axis. Also, each pair of the transparent electrodes are electrically connected. Respective of signal application terminals of these transparent electrodes are represented by a, b, . . . m from the outside. As the laser beam 25, a straight deflection beam can be used. In the alternative, a deflection plate 23 is arranged in front of the electro-optic crystal 20 to incite the beam after passing through the deflection plate. At the discharge side, a deflection plate 24 for an analyzer is arranged in such an orientation as to pass the laser beam when no voltage is charged to the electro-optic crystal 20.

Figure 11:
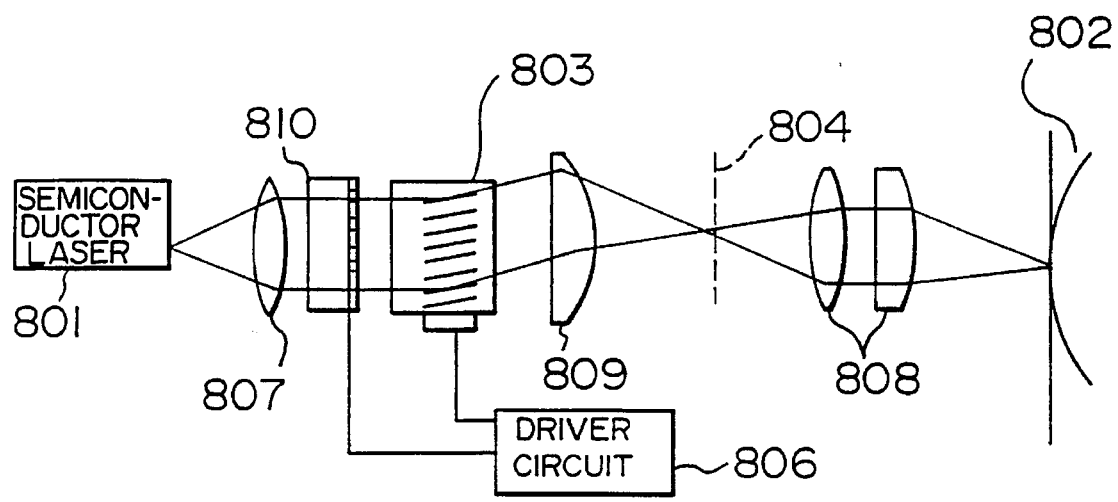
FIG. 11 is a diagrammatic illustration of the laser optical system employing an EO element.

In the present invention, as shown in FIG. 11, the light discharged from the semiconductor laser 801 is converted into a parallel beam by a lens 807. The parallel beam is converted into a passing beam in the variable focusing element 810 by applying a voltage to a deflection surface. The diameter of the beam flux of the passing laser beam is varied by only passing the original deflection component by a deflector element 24 which is arranged at an optically immediately downstream side of the variable focusing element 810. Subsequently, the desired beam is irradiated onto the surface of the photosensitive drum 802 via an ultrasonic wave light deflector 803 having the same construction as that of FIG. 8B. When the diameter of the beam flux is smaller, the diameter of the spot on the surface of the photosensitive drum 802 becomes greater. The variation of the diameter is linear. Therefore, by adapting the direction, the spot diameter in the subsidiary scanning direction can be varied. On the other hand, similarly to the former embodiment, the ultrasonic wave light deflector 803 is used for varying the spot position.

Another embodiment of the present invention will be discussed herebelow with reference to FIGS. 13A to 13C.

There is a recently growing demand for recording of half-tone images by a laser printer. In a laser printer, the half-tone is generally reproduced by the sizes of fine half-tone dots. At this time, the definition of the image is determined by the pitch of the half-tone dots. Therefore, for high definition recording of the half-tone image, the area of the fine half-tone dots has to be subject to fine adjustment. Also, in order to precisely reproduce the area, the configuration of the half-tone dot is preferred to be a circle which has a minimum edge portion of the dot, where recording can be unstable. Conventionally, the half-tone dot diameter in the subsidiary scanning direction is adjusted per every scanning line to make the fine adjustment difficult. Particularly, upon recording of fine dots of black or white in the high-light portion and shadow portion of the image, the configuration of the dot tends to become abnormal to make precise area modulation difficult. The method of formation of the half-tone dot according to the present invention is illustrated in FIG. 13D. FIGS. 13A to 13C show the results of recording when the area of the dot is gradually increased in the prior art. At FIG. 13C, the center position of the half-tone dot is offset in an upward direction. In addition, the configuration of the dot becomes non-circular. FIG. 13D shows an example of recording according to the present invention, which corresponds to the prior art recording example of FIG. 13C. In the drawing, thick lines represent the artificial scanning line displaced in the subsidiary scanning direction by the present invention. In the present invention an accurate fine dot area can be recorded at the accurate position. Even for a larger dot than that of FIG. 13D, it is similarly possible to record the edge in circular configuration.

With the shown embodiment, the fine half-dot can be recorded at an accurate position with an accurate area. In addition, since the shown embodiment allows multi-level area modulation using the subsidiary scanning direction displacement, it allows high definition and high quality half-tone recording. Furthermore, a laser printer which can perform half-tone recording giving more natural impression can be realized by enabling variation of the restricted laser spot diameter as illustrated in the former embodiment.

A further embodiment of the present invention will be discussed with reference to FIGS. 15, 16A, 16B, and 16C.

Figure 15A:
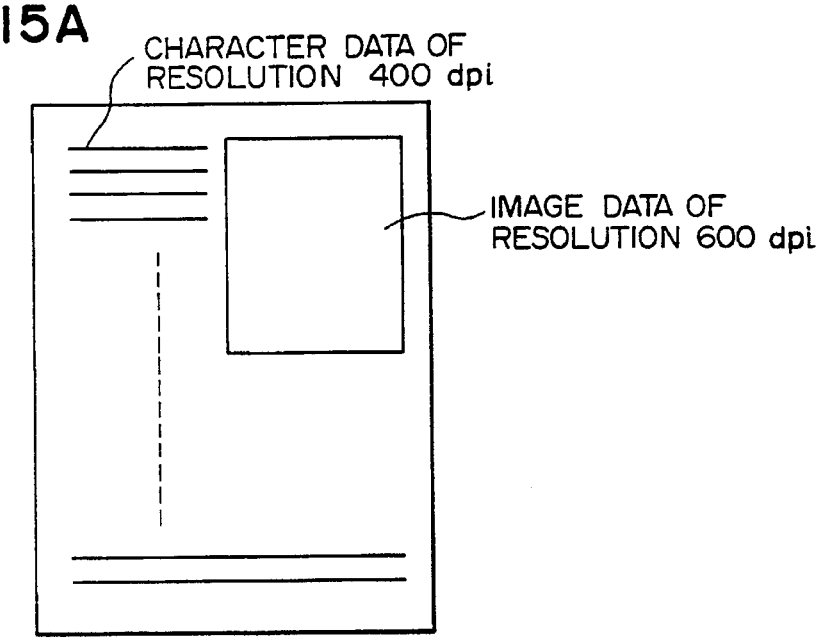
FIGS. 15A to 15C are illustrations showing a manner for partially varying resolution during scanning.
Figure 15B:
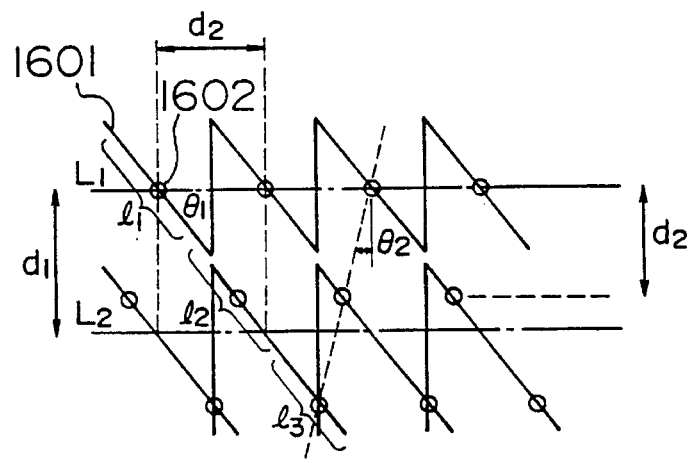

As shown in FIG. 15A, among documents handled in offices or so forth, there are high resolution portions, such as drawings, photographs and so forth, which have to be recorded with a high resolution, and normal portions which can be recorded at a normal resolution. Most of the general documents are recorded with the normal resolution portions. It is not economical to provide high resolution for the overall image including a small high resolution portion, since the high resolution portion requires a large amount of data. Therefore, by partially varying the resolution within the image, it becomes possible to reproduce the image with high efficiency. For the laser printer for recording such image data, a similar capability is required. For instance, when a high resolution portion which is required to be recorded at a resolution of 800 dpi (dots per inch) or 1200 dpi is contained in image data, most of which can be recorded at the resolution of 600 dpi, high resolution recording at the resolution of 800 dpi or 1200 dpi only for the limited region may be used while maintaining the scanning line interval for the 600 dpi portion is enabled by the present invention. This has been not possible in conventional laser printers. FIG. 15B is an explanatory illustration of this embodiment. Study is made to reduce an interval to d2 from a basic scanning line interval d1. At this time, as shown in FIG. 15B, artificial scanning lines 1601 having an inclination $\theta1$ with respect to a primary scanning direction are formed with an interval d2 in the primary scanning direction. The inclination $\theta1$ can be expressed by the following equation:

$$\tan \theta1 = -d1/d2$$

Furthermore, points on the artificial scanning lines 1601 corresponding to the interval d2 in the subsidiary scanning direction are identified. These identified points are taken as central points 1602 of pixels (indicated with a circle in the drawing). As shown, the section of the artificial scanning line 1601 corresponding to a distance d2/2 from the pixel center points 1602 in the primary scanning direction are assumed as 11, 12 and 13. These sections correspond to respective lines on the high resolution image data. By modulating the laser output corresponding to the high resolution image data during scanning in these sections, high resolution recording centered at the pixel center points 1602 can be accomplished. In this case, the pitch of the dots becomes d2. Of course, the diameter of the laser beam spot has to be reduced corresponding thereto. Reduction of the laser spot beam can be done in the manner as discussed in the former embodiment. Attention has to be paid to the fact that the position in the primary scanning direction of the pixel center points 1602 at respective of the sections 11, 12, 13 are offset toward the left in a magnitude corresponding to a constant angle $\theta2$ as expressed by the following equation:

$$\tan \theta2 = (d1-d2)/d1$$

Figure 15C:
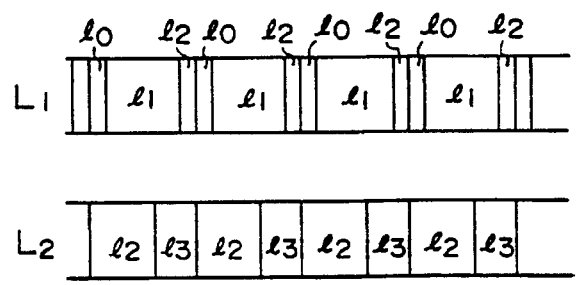

This can be compensated on the image data of the computer. Most typically, compensation can be done by once interpolating in the primary scanning direction, and re-sampling the same while taking the angle $\theta2$ into account. On the other hand, FIG. 15C shows the laser output modulation signal corresponding to the normal scanning lines L1 and L2, in which the positions in the primary scanning direction are coincident to those in FIG. 15B. For example, when the L2 scanning line is scanned, the laser output modulation signal may alternately record each line data of the high resolution image data. It should be noted that, in the illustrated embodiment, it is possible that the recording resolution can be made greater than the scanning line density (d2>d1). Also, the region can be extended over the overall page.

The results of the practical implementation is shown with concrete figures, in FIGS. 16A, 16B and 16C. The resolution of the laser printer used was 600 dpi. The left-upper region shows the case, in which recording was performed with a resolution of 1200 dpi according to the present inventions.

Also, the right-upper region shows the case, in which recording was performed with a resolution of 800 dpi. According to the shown embodiment, since the page to be recorded can be divided into several regions depending upon the image to be recorded and the resolutions for respective regions can be varied in random fashion, high definition image recording can be performed with necessary minimum image data.

A still further embodiment of the present invention will be discussed with reference to FIGS. 17A, 17B and 17C. By progress of desk top publishing, it has become necessary to record the image while rotating the same. Typically, when the rotated image is recorded by the laser primer, it is likely to cause variation of the configuration per se or variation of tone characteristics (density) of the half-tone image with half-tone dots. This is true in all of the recording apparatus of similar scanning type. This is caused due to a difference of recording characteristics between the primary scanning direction and the subsidiary scanning direction; FIG. 17B shows the image which corresponds to the concrete image of FIG. 17A and rotated over an angle θ3. Variation of the configuration of the recorded image can be avoided by establishing the artificial scanning lines 1801 adapted to the position and direction of the image after rotation. FIG. 17C shows the manner of establishing the artificial scanning line 1801. With the shown manner, the artificial scanning line 1801 relative to the desired angle (−90°<θ3<−90°) of rotation can be established.

With the shown embodiment, when the image is recorded with rotation, influence of the direction of the scanning line can be avoided so that the recorded image will not vary the configuration or tone characteristics.

Figure 18A:
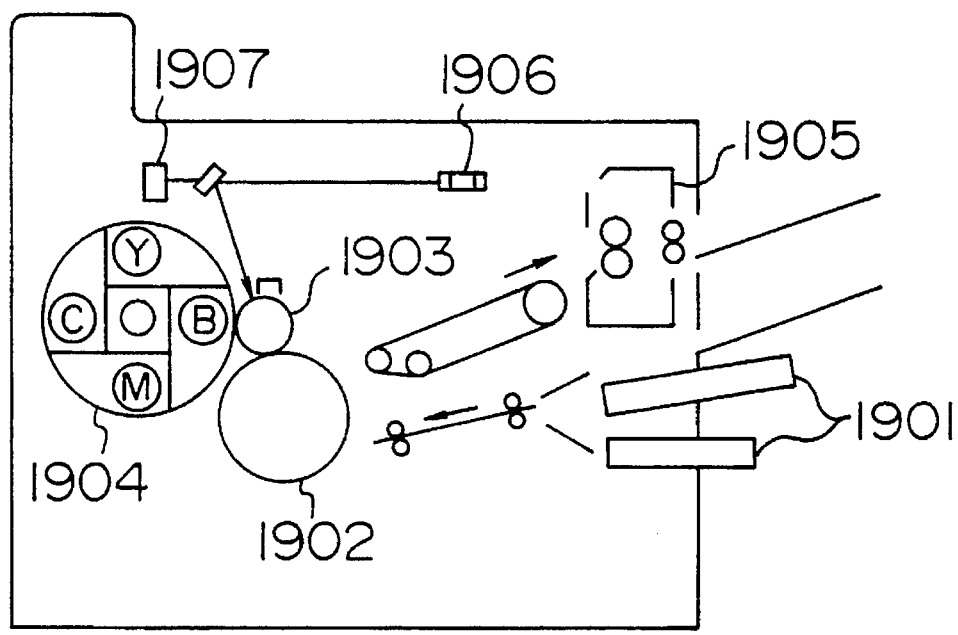
FIGS. 18A and 18B are diagrammatic illustrations showing a construction of a full color laser printer to which the present invention is applied.
Figure 18B:
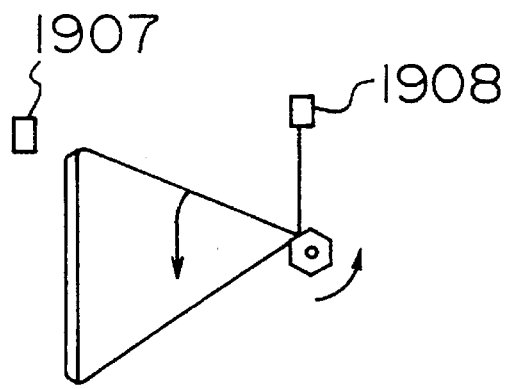

A further embodiment of the present invention will be discussed with reference to FIGS. 18A, 18B, 19A and 19B. FIGS. 18A and 18B shows the construction of the conventionally known full color laser printer.

In FIG. 18A, a sheet withdrawn from a sheet cassette 1901 is wrapped once around a transfer drum 1902. On the sheet wrapped on the transfer drum, each color of tonor image formed on a photosensitive drum 1903 by a normal electrophotographic process is transferred over each cycle of rotation. By changing of developer 1904, yellow, magenta, cyan and black images are overlain on the sheet. Then, the sheet is removed from the transfer drum and ejected through a fixer 1905. Although the shown color printer overlays the color on the sheet, there are other types of printers which overlay the colors on the photosensitive drum or on an intermediate transfer drum. In either case of the color printer which performs color overlaying, improvement for accurate indexing of respective color images has been desired. It is clear that when the subsidiary scanning line displacement magnitude control for the scanning line according to the present invention is performed, higher accuracy of indexing is required. Particularly, the indexing in the subsidiary scanning direction is typically performed on the basis of a detection signal LCLK shown in FIGS. 19A and 19B, from a scanning position detector 1907 (see FIG. 18A) for the laser beam which is scanned by a polygon mirror rotating independently of the color overlaying medium (transfer body, photosensitive body, intermediate transfer body or so forth). Therefore, an inherent relative index error of the second color image relative to the first color image becomes ±½ line. In order to solve such a problem, the present invention controls the displacement magnitude in the subsidiary scanning direction in the following manner.

Figure 19A:
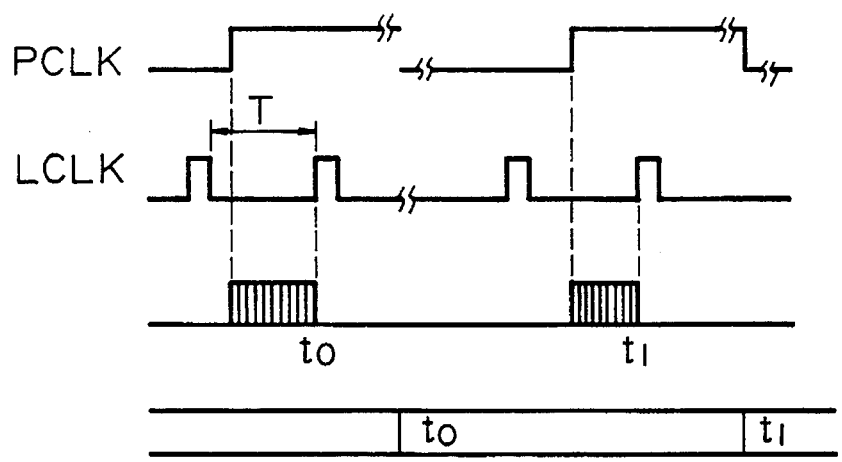
FIGS. 19A and 19B are a timing chart and a circuit diagram of a scanning system for a recording signal, respectively.
Figure 19B:
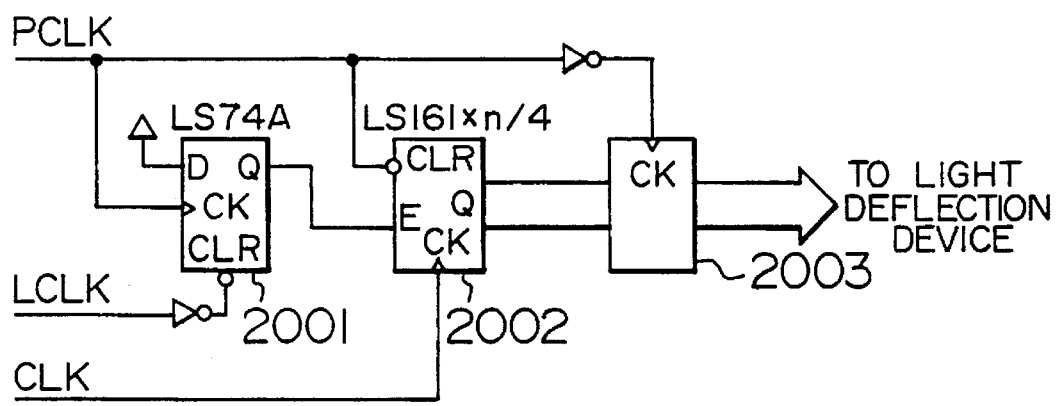

A timing chart and a circuit diagram of the shown embodiment is illustrated in FIGS. 19A and 19B. The color overlaying medium (transfer body, photosensitive body, intermediate transfer body or so forth) is normally formed with a cut-out so that the position thereof can be read by a photo sensor or so forth. The signal indicative of detection of the cut-out is obtained immediately before recording of each color image and thus serves as a reference clock PLCK for providing reference for color overlaying. The detection signal LCLK is not a periodic signal with an equal interval in the strict sense due to surface inclination of the polygon mirror 1906 or so forth, but can be regarded as an approximately regular interval periodic signal. The period of the detection signal is assumed as T. As set out above, the detection signal LCLK is not synchronous to the reference clock PLCK. Therefore, as shown in FIG. 19A, a rising timing t of the next detection signal LCLK from rising of the reference clock PLCK is variable in each color. In the shown example, the rising timing t of the first image is assumed as $t_0$ and the rising timing of the second image is assumed as $t_1$. Assuming the interval of the scanning lines is L, the index error ΔL between two images can be expressed by the following equation:

$$\Delta L = (t_1 - t_0) \times L/T$$

Therefore, by deflecting the scanning line in the subsidiary scanning direction for each color in a magnitude expressed by $$\Delta Lc(t) = -t \times L/T$$

index error between respective colors will never be caused. FIG. 19B shows one concrete example of a circuit of the shown embodiment. A D-flipflop (hereafter referred to as DFF) 2001 generates a timing signal for counting of an n bit counter 2002. At the trailing edge of the reference clock PCLK after counting the output of the counter 202 is latched by an n bit D-flipflop 2003. The latched counter value is then output to the subsidiary scanning direction deflection device.

With the shown embodiment, in the printer forming the full color image by overlaying colors, the index error between respective images in the subsidiary scan direction can be restricted at most ±L/2. This makes it possible to apply the present invention to a full color printer.

Although the shown embodiment uses the beam detection signal LCLK for detecting the index error between the images, there is certain magnitude of inherent error due to error contained in the detection signal LCLK due to inclination of surface of the polygon mirror 1906 or so forth to limit the precision level to be achieved. In order to achieve further higher precision, the following construction can be employed.

Although the polygon mirror 1906 contains the surface inclination error, it rotates quite smoothly. The polygon mirror 1906 is normally coupled with a simple pulse encoder for rotation control. Therefore, in the shown embodiment, a hexagonal polygon mirror is used and one pulse signal LCLK is generated per every one cycle of rotation by the pulse encoder. The rotational position of the polygon mirror 1906 can be detected based on this pulse signal LCLK. The signal LCLK containing no error due to the surface inclination can be used in place of the beam detection signal LCLK in the former embodiment. In this case, in order to deflect the scanning lines for respective color in the subsidiary scanning direction in a magnitude expressed by $$\Delta Lc(t) = -t \times L/(6 \times T)$$

the maximum deflection magnitude becomes for six lines (6 L). However, the first scanning lines for initiating drawing of respective colors of images are scanned in the identical surface of the hexagonal polygon mirror. Therefore, all scanning lines overlain for respective color images are scanned by identical surfaces of the hexagonal polygon mirror.

With this embodiment, precise indexing while avoiding influence of the surface inclination of the polygon mirror becomes possible. Also, since overlain scanning lines for respective colors are scanned by the same surface of the polygon mirror, the error due to surface configuration of the polygon mirror can be successfully canceled to realize further precise indexing.

As set forth above, according to the present invention, since the position of the scanning line of the laser beam can be displaced for each pixel depending upon the kind of the image to be recorded, a laser printer which can achieve high definition and high image quality recording, can be realized without increasing the scanning line density and mechanical precision associated thereto.

What is claimed is:

1. An optical recording apparatus comprising:
a light source generating a laser beam;
control means for controlling scanning of said laser beam of an image to be recorded in a primary scanning direction and a subsidiary scanning direction;
recording means for recording input image information using said laser beam;
wherein said control means includes:
means for deriving an amount of displacement of a scanning line of said laser beam in said subsidiary scanning direction with respect to each pixel depending upon said image information; and
means for displacing said laser beam in accordance with said derived amount of displacement.

2. An optical recording apparatus as set forth in claim 1, where said means for displacing simultaneously displaces the scanning line of said laser beam in the primary scanning direction and in the subsidiary scanning direction.

3. An optical recording apparatus comprising:
a light source generating a laser beam;
control means for controlling scanning of said laser beam of an image to be recorded in a primary scanning direction and a subsidiary scanning direction;
recording means for recording input image information using said laser beam;
wherein said control means includes:
displacing means for displacing a scanning line of said laser beam in said subsidiary scanning direction with respect to each pixel depending upon said image information; and
scanning line information generating means for generating at least one of a modulation data of a light amount of said laser beam based on sampled pixel data of said image information and displacement magnitude data for displacing the position of the scanning line of said laser beam in said subsidiary scanning line, for each pixel.

4. An optical recording apparatus as set forth in claim 3, wherein said scanning line information generating means comprises a memory storing generated data and said control means includes converting means for converting the data stored in said memory into recording data.

5. An optical recording apparatus comprising:
a light source generating a laser beam;
control means for controlling scanning of said laser beam of an image to be recorded in a primary scanning direction and a subsidiary scanning direction;
recording means for recording input image information by means of said laser beam;
wherein said control means includes:
displacing means for displacing the scanning line of said laser beam in said subsidiary scanning direction with respect to each pixel depending upon said image information; and
artificial scanning line establishing means for establishing an artificial scanning line in a direction different from said primary scanning direction and said subsidiary scanning direction.

6. An optical recording apparatus as set forth in claim 5, wherein said artificial scanning line is established along an end of the image represented by said image information.

7. An optical recording apparatus as set forth in claim 5, wherein said artificial scanning line is established along an edge of an oblique line or a curved line represented by said image information.

8. An optical recording apparatus as set forth in claim 5, wherein said artificial scanning line is established as a bisector of an angle of an acute angle tip end represented by the image information.

9. An optical recording apparatus as set forth in claim 5, wherein said artificial scanning line is established along the circumference of half-tone dots represented by the image information.

10. An optical recording apparatus as set forth in claim 5, wherein said artificial scanning line is established on the basis of the area of half-tone dots represented by the image information.

11. An optical recording apparatus as set forth in claim 5, wherein said artificial scanning line is established with an oblique angle based on a rotation angle indicated in said image information.

12. An optical recording apparatus as set forth in claim 5, which further comprises area forming means for forming a plurality of random configuration areas to be recorded with difference scanning line density of said artificial scanning lines, for an image to be recorded simultaneously.

13. An optical recording apparatus as set forth in claim 1, wherein the image information comprises at least one of resolution information, rotation information and density information.

14. An optical recording apparatus as set forth in claim 3, wherein the image information comprises at least one of resolution information, rotation information and density information.

15. An optical recording apparatus as set forth in claim 5, wherein the image information comprises at least one of resolution information, rotation information and density information.

16. An optical recording apparatus as set forth in claim 3, wherein the scanning line generating means generates the modulation data of the light amount of the laser beam based on sampled pixel data of the image information and displacement magnitude data for displacing the position of the scanning line of the laser beam in the subsidiary scanning line, for each pixel.

17. An optical recording apparatus as set forth in claim 1, wherein the scanning line of the laser beam is continuously deflected in the subsidiary direction and the light emitting output intensity of the laser beam is continuously changed to change the thickness of the laser beam.

18. An optical recording apparatus as set forth in claim 1, wherein the mount of deflection of the laser beam scanning line is limited to a maximum of ½ of the scanning line interval and the next scanning line may be used to record a remainder when a deflection exceeding limit is required, with the light emitting output being continuously changed.

19. An optical recording apparatus as set forth in claim 3, wherein the scanning line of the laser beam is continuously deflected in the subsidiary direction and the light emitting output intensity of the laser beam is continuously changed to change the thickness of the laser beam.

20. An optical recording apparatus as set forth in claim 3, wherein the amount of deflection of the laser beam scanning line is limited to a maximum of ½ of the scanning line interval and the next scanning line may be used to record a remainder when a deflection exceeding limit is required, with the light emitting output being continuously changed.

21. An optical recording apparatus as set forth in claim 5, wherein the scanning line of the laser beam is continuously deflected in the subsidiary direction and the light emitting output intensity of the laser beam is continuously changed to change the thickness of the laser beam.

22. An optical recording apparatus as set forth in claim 5, wherein the amount of deflection of the laser beam scanning line is limited to a maximum of ½ of the scanning line interval and the next scanning line may be used to record a remainder when a deflection exceeding limit is required, with the light emitting output being continuously changed.

* * * * *